M. TWORSKI.
PLANTING MACHINE.
APPLICATION FILED MAY 4, 1920.
1,396,900.
Patented Nov. 15, 1921
2 SHEETS—SHEET 2.
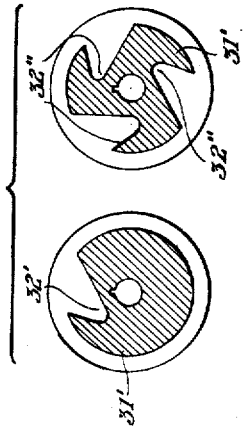
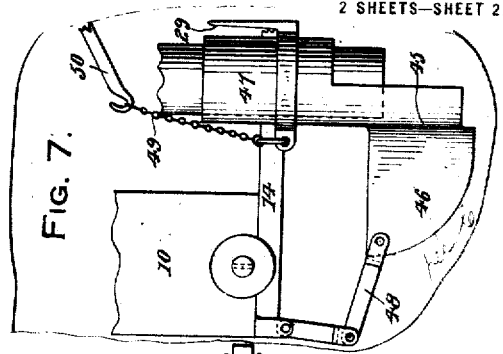
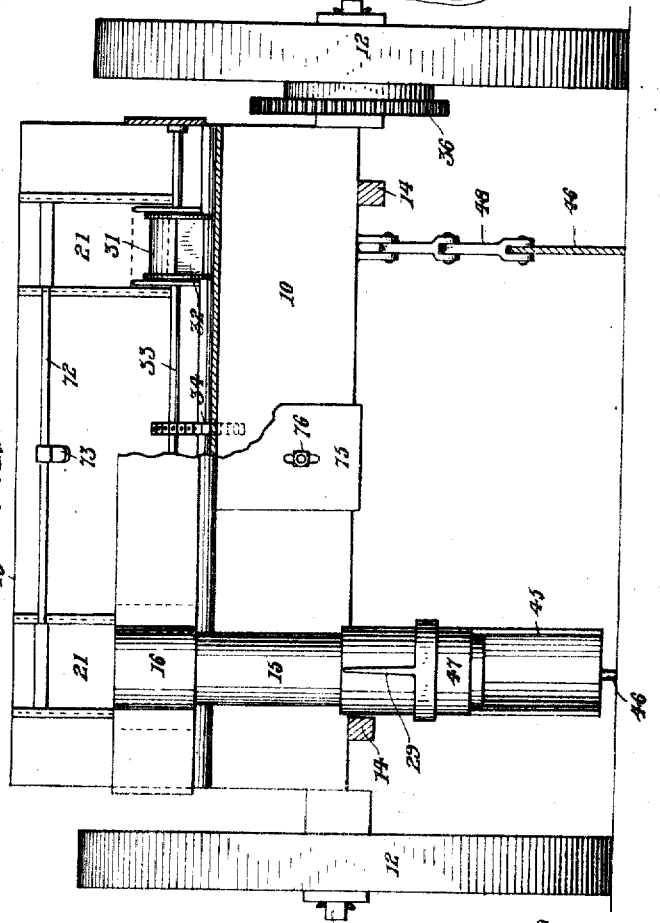
Inventor
M. Tworski
By N. M. Wilson
Attorney

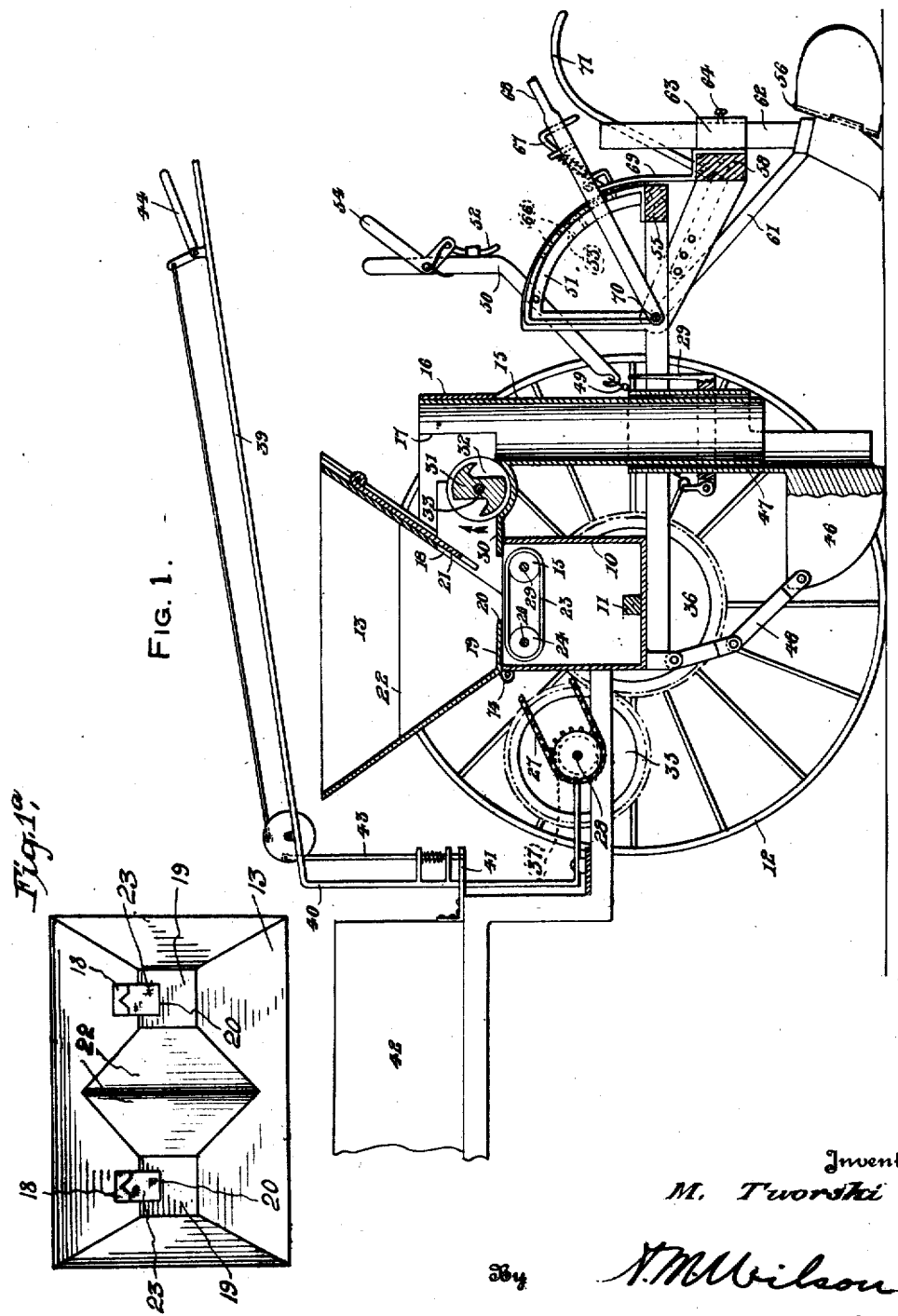

UNITED STATES PATENT OFFICE.

MARTIN TWORSKI, OF VANCOUVER, BRITISH COLUMBIA, CANADA, ASSIGNOR OF ONE-HALF TO MICHAEL SZYMANSKI, OF WINNIPEG, MANITOBA, CANADA.

PLANTING-MACHINE.

1,396,900. Specification of Letters Patent. Patented Nov. 15, 1921.

Application filed May 4, 1920. Serial No. 378,734.

*To all whom it may concern:*

Be it known that I, MARTIN TWORSKI, a citizen of Poland, residing at Vancouver, in the Province of British Columbia and Dominion of Canada, have invented certain new and useful Improvements in Planting-Machines, of which the following is a specification.

The primary object of the invention is the provision of a planter for potatoes and the like adapted for easily and quickly planting a large area during the travel of the machine over the field, the operations being readily controlled by a single attendant, any suitable motive power such as draft animals or a tractor being employed to impart forward movement to the device.

A further object of the invention is to provide a planter possessing great strength and serviceability for planting potatoes uniformly distributed and covered in a field, the operation of the mechanism being easily and quickly controlled adjacent the rear thereof.

With these general objects in view and others that will appear as the nature of the invention is better understood, the same consists in the novel construction, combination and arrangement of parts hereinafter more fully described, illustrated in the accompanying drawings, and pointed out in the appended claims.

In the drawings forming a part of this application, and in which like reference characters designate corresponding parts throughout the several views, Figure 1, is a vertical central sectional view through the device, Fig. 1ª is a top plan view of my hopper construction, showing the same divided into a plurality of compartments.

Fig. 2 is a rear elevation of the same with parts broken away, and

Fig. 3 shows different forms of the potato feeding members in transverse section.

Referring more in detail to the drawings, my invention broadly includes a rectangular body or box 10 carried by an axle 11 with ground wheels 12 journaled thereon, a potato receiving hopper 13 being mounted transversely of the machine upon said box 10 while forwardly projecting side rails 14 provide ready means for the attachment of a draft device, not shown. The potato-dropping mechanism includes a plurality of vertical tubes 15 rearwardly of the box 10 attached to the hopper 13 by straps 16 and having their inner sides cut away as at 17, adjacent outlet openings 18 in the rear wall of the hopper 13. The bottom 19 of the hopper 13 is provided with openings 20, adjacent the openings 18, the latter being controlled by slides 21. The hopper 13 is divided into separate compartments by an inverted V shaped partition 22 here illustrated as two in number, corresponding to the number of planting tubes 15, one of said openings 20 being provided for each tube in the bottom of the adjacent compartment 22.

An endless belt 23 beneath each hopper opening 20 is mounted upon drums 24 and 25, the former being carried by a shaft 26 operatively connected by a sprocket chain 27, to a drive shaft 28, while the drums 25 are mounted upon an idler shaft 29. The shafts 26 and 29 extend longitudinally within the box 10 with the belts 13 longitudinally of the machine forming rearwardly shifting bottom portions for the hopper compartments afforded by the partition 22 whereby potatoes positioned in the hopper 13 are moved rearwardly through the openings 21 upon extensions 30 of the hopper bottom 19.

A feed roll 31 is journaled between each extension 30 and cut away portion or mouth 17 of the tubes 15, being provided with pockets 32 for receiving the desired number of potatoes or parts thereof for dropping into the tubes 15 during the planting operation. The feed rolls 31 are secured to a shaft 33 operatively connected by a chain 34 with the shaft 26 and the shaft 28 being connected by meshing gears 35 and 36 with one of the revolving ground wheels 12, it will be understood that the belts 23 and feed rolls 31 will be operated simultaneously with the forward travel of the machine over the field to be planted.

A suitable clutch 37 upon the drive shaft 28 controls connection with the sprocket chain 27, a pivoted shift lever 38 being provided with the clutch having an angular handle 39 projecting upwardly and rearwardly of the machine. The upright portion 40 of the handle 39 is pivoted in a plate 41 secured to a receptacle 42 mounted upon the side rails 14 while an adjusting retaining rod 43 is adapted for engaging the plate 41 and controlled by a lever 44 upon the handle 39 for retaining the clutch 37 into and out of clutching engagement with the sprocket chain 27. A furrowing digger 45 comprising a forwardly projecting blade 46 mounted upon a sleeve 47 vertically slidable upon the feed tube 15 adjacent the bottom thereof is adapted for plowing a furrow through the previously mellowed ground for receiving potatoes through the tube 15 during the forward travel of the machine.

Flexible links 48 connect the blade 46 of each digger with the bottom of the box 10 while chains 49 connect the sleeves 47 together for the attachment of an adjacent lever 50. The lever 50 is pivoted to a frame 51 and provided with a retaining pin 52 adapted for entering a keeper 53 upon the frame 51 when the lever 50 is rearwardly shifted with the diggers 15 in their elevated inoperative positions. A rocker arm 54 controls the pin 52 and the operation of the digger mechanism will be apparent, it being only necessary to release the pin 52 from the keeper 53 by means of the arm 54, to permit the diggers 45 to lower by reason of their own weight to their operative positions for furrowing the ground.

A U-shaped frame 55 carried by the bottom of the box 10 and rearwardly projecting therefrom serves as a mounting for the frame 51, the tubes 15 being within said frame.

Plows 56 are provided substantially rearwardly of each wheel 20 with a similar plow centrally therebetween for covering the furrows after dropping the potatoes therein, a transverse bar 58 rearwardly of the frame 55 providing a mounting for the said plows. A transverse shaft 59 carried by the frame 55 has brackets 60 secured to the bar 58 and pivoted thereon while braces 61 extend from upright plow beams 62 to journaling points adjacent the ends of the rod 59.

The beams 62 are adjustably positioned in collars 63 upon the bar 58 having set screws 64 for maintaining the beams 62 suitably adjusted. A rack 65 upon the frame 55 has a plurality of perforations 66 for engagement by a spring-pressed pin 67 carried by a lever 68 connected by band 69 with the bar 58 and pivoted to the rack 65 at its inner end 70. Rearwardly projecting handles 71 upon the bracket 60 are adapted to be grasped by the attendant, it being intended that by pulling upwardly on the handle 71, the bar 58 and plows 56 and 57 will be raised while the pin 67 will ratchet over the rack 65, automatically engaging one of the perforations 66, when the plows are at the desired elevation. For lowering the plows 56 and 57, it is only necessary to retract the pin 67, permitting the bar 58 to lower toward the ground.

The two hopper compartments with their potato-dropping mechanism are adapted for simultaneous operation when the clutch 37 is closed, the openings 18 being simultaneously controlled by the slides 21 actuated by a connecting rod 72 having a substantially central handle 73.

The hopper 13 is hinged as at 74, to the forward side of the box 10 while a swinging hook 75 at the rear of the hopper engages beneath the rear side of the box 10, for retaining the hopper 13 in position thereon, suitable securing means 76 being provided through said hook.

The feed roll 31 is illustrated with two pockets 32 although this number may be varied for changing the number or quantity of seed to be carried into the adjacent tube 15, rolls 31' and 31" being shown in Fig. 3 of the drawings, upon an enlarged scale and in section provided with one pocket 32' and three pockets 32" respectively. Furrow diggers 45 may be weighted if desired by attaching weight members, not shown, to hooks 79 carried by the sleeves 47.

The complete operation of the invention will be understood from this detailed description thereof, the clutch 37 being closed by the lever 39 and the diggers 45, lowered for forming parallel furrows in the ground in advance of the open tubes 15 during the forward travel of the machine over the field. Potatoes from the receptacle 42 are shoveled into the compartments 22 of the hopper 13 and the movement of the belts 23 carries the potatoes through the openings 21, over the extensions 30 and into the pockets 32 of the feed rolls 31 which latter revolve in the direction indicated by the arrow in Fig. 1 of the drawings. These feed rolls 31 deposit the potatoes through the mouths 17 into the upright tubes 15 through which the potatoes fall into the newly made furrows.

The oncoming plows 66 and 67 cover up the potatoes in the furrows, the furrows made by the diggers 45 being positioned between the plows. Large areas may be planted with potatoes in this manner by driving the machine back and forth across the field and it will be evident that other seed than seed potatoes may be planted by the device if desired.

While the form of the invention herein shown and described is what is believed to be the preferred embodiment thereof, it is nevertheless to be understood that various forms, modifications and arrangements of the parts may be made without departing from the spirit and scope of the invention as claimed.

What I claim as new and desire to secure by Letters Patent, is:—

1. An agricultural implement comprising a frame, a multiple compartment hopper hinged to the top of the frame and having openings in the bottom and rear wall thereof, a receptacle disposed beneath said hopper, an endless belt associated with each hopper opening and located in the receptacle and adapted for horizontal travel beneath the hopper openings, a portion of the bottom wall of the hopper overlying the endless belt whereby the contents of the compartments are adapted for rearward travel upon said belts outwardly of the compartments and dropping means adapted for rearwardly feeding the contents of the compartments received from said belt.

2. An agricultural implement comprising a frame, a multiple compartment hopper hinged to the top of the frame having openings in the bottom and rear wall thereof, a receptacle disposed beneath said hopper, an endless belt associated with each hopper opening and located in the receptacle and adapted for horizontal travel beneath the hopper openings, a portion of the bottom wall of the hopper overlying the endless belt whereby the contents of the compartments are adapted for rearward travel upon said belts outwardly of the compartments, upright tubes carried by the hopper having mouths rearwardly of said belts and feed rolls between the belts and the mouths of the tubes adapted to revolve simultaneously with the operation of the belts whereby the contents of the hopper is transferred in predetermined quantities from the belt into said tubes.

In testimony whereof I affix my signature.

MARTIN TWORSKI.